Figure 1:
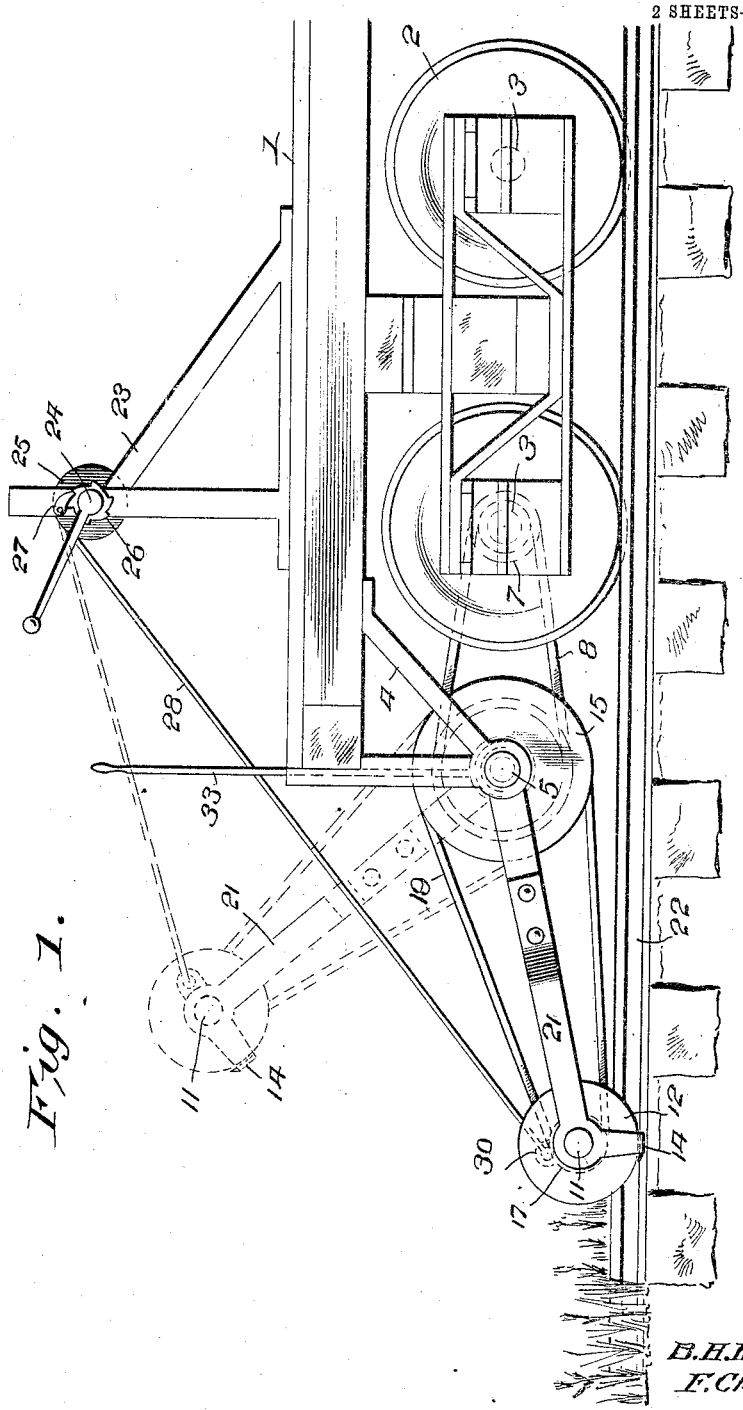

No. 842,199. PATENTED JAN. 29, 1907.
B. H. HERRICK & F. CLEARY.
GRASS CUTTER.
APPLICATION FILED MAY 22, 1906.

2 SHEETS—SHEET 1.

Witnesses

Inventors
B. H. Herrick &
F. Cleary

By W. J. FitzGerald
Attorneys

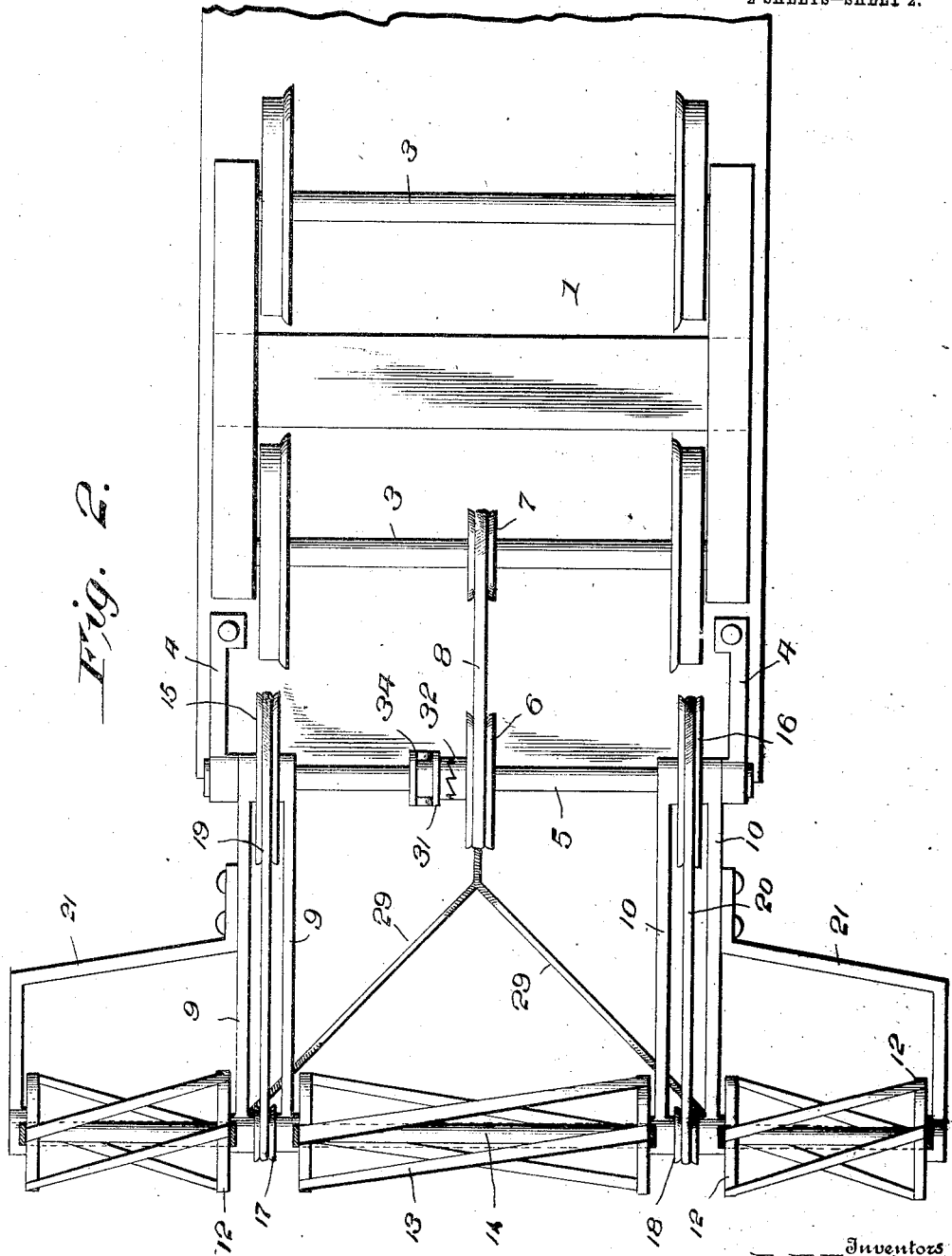

UNITED STATES PATENT OFFICE.

BERT H. HERRICK AND FRANK CLEARY, OF RUGBY, NORTH DAKOTA.

GRASS-CUTTER.

No. 842,199.  Specification of Letters Patent.  Patented Jan. 29, 1907.

Application filed May 22, 1906. Serial No. 318,211.

*To all whom it may concern:*

Be it known that we, BERT H. HERRICK and FRANK CLEARY, citizens of the United States, residing at Rugby, in the county of Pierce and State of North Dakota, have invented certain new and useful Improvements in Grass-Cutters; and we do hereby declare the following to be a full, clear, and exact description of the invention, such as will enable others skilled in the art to which it appertains to make and use the same.

Our invention relates to new and useful improvements in grass-cutters, and more particularly to that class adapted to be used in connection with railway-tracks; and our object is to provide a device of this class which may be connected to a hand-car or the like and the momentum thereof employed for operating the cutting mechanism.

A further object is to provide means for raising or lowering said cutting device; and a still further object is to provide means for engaging or disengaging the cutting device from the source of power.

Other objects and advantages will be hereinafter made clearly apparent in the specification and pointed out in the claims.

In the accompanying drawings we have shown the preferred form of our invention.

In said drawings, Figure 1 is a side elevation of our improved cutting device attached to one end of a car and showing the position of the cutting parts when not in use by dotted lines; and Fig. 2 is a bottom plan view thereof, showing portions thereof broken away.

Referring to the figures by numerals of reference, 1 indicates the floor of a car, which is mounted upon suitable carrying-wheels 2, said wheels being in turn mounted upon the usual form of axle 3. Mounted in suitable brackets 4 at one end of the floor 1 is a horizontally-disposed shaft 5, which has mounted thereon a grooved wheel 6, while a similarly-grooved wheel 7 is secured to one of the axles 3, said wheels having disposed therearound a driving-belt 8 and by which means the shaft 5 is rotated.

Parallel arms 9 and 10 are mounted upon the shaft 5 and carry at their outer ends a shaft 11, which is designed to carry a plurality of disks 12, which are arranged in pairs, and each pair has secured upon their periphery a plurality of cutting-blades 13, said blades being designed to successively engage cutting-bars 14, disposed below the disks 12 and parallel with the shaft 11. The arms 9 and 10 are disposed in pairs, each pair having a wheel 15 and 16, respectively, mounted therebetween and upon the shaft 5, while the opposite end of said arms have mounted therebetween and upon the shaft 11 similar wheels 17 and 18, respectively, said wheels having disposed therearound driving-belts 19 and 20, respectively, and by which means the cutting-blades 13 are operated.

The shaft 11 projects beyond the arms 01 and 9, and the extreme outer ends thereof are supported by means of brackets 21, the arms 9 and 10 and the brackets 21 being so spaced apart upon the shaft 11 that it is divided into three sections, the central section carrying blades of sufficient length to cover the space between the track-rails 22, while the spaces at each end thereof are of less width and the cutting-blades disposed in said spaces being of a corresponding length, said blades being of sufficient length to cut the grass adjacent to the supporting-ties.

In order to raise or lower the arms 9 and 10 and parts carried thereby, a frame 23 is secured to the floor of the car, and in said frame is rotatably mounted a shaft 24, upon which is disposed a suitable winding-drum 25, a ratchet-wheel 26 and latch 27 being employed to retain said parts in their adjusted positions. One end of a cable 28 is secured to the winding-drum 25, the outer end of said cable being bifurcated, the ends 29 thereof being disposed in connection with ears 30 upon the arms 9 and 10, so that when the drum 25 is rotated in one direction the arms 9 and 10 and parts carried thereby will be elevated, as shown by dotted lines in Fig. 1 of the drawings. It will also be seen that the height of the cutting-blades above the ground may be readily regulated. A clutch 31 is disposed around the shaft 5 and is designed to engage the toothed hub 32 of the grooved wheel 6, and the clutch is placed under the control of the operator by means of a lever 33, which is pivotally secured to the end of the car-floor and has its bifurcated lower end 34 extending into engagement with the clutch 31, so that by moving said lever from side to side the clutch will be disposed into or out of engagement with the hub 32. It will now be seen that when the car is moving forward the cutting-blades 13 will be rapidly revolved through the medium of the driving-belts 8, 19, and 20, respectively, axle 3, and the shafts 5 and 11. In the construction shown we have provided a very cheap and durable cutting device and one that can be readily applied to use upon any form of car.

What we claim is—

1. The combination with the running-gear of a car, and a floor mounted on said running-gear; of a shaft, means to secure said shaft to the floor of the car, arms arranged in pairs and mounted at one end upon said shaft, a shaft at the outer ends of said arms and extending beyond each side of said arms, brackets to support the outer ends of said shaft, cutting-blades disposed upon said shaft, means to rotate said shaft and cutting-blades, and additional means to raise or lower said arms and parts carried thereby.

2. In a device of the class described, the combination with the running-gear of a car, and a floor mounted upon said running-gear; of a shaft, brackets to secure said shaft to the floor of the car, arms secured to said shaft and disposed in pairs, a shaft at the outer ends of said arms, disks disposed in pairs upon said shaft, cutting-blades secured to each pair of disks, wheels on said shaft and between each pair of arms, similar wheels upon the first-mentioned shaft, driving-belts disposed around said wheels, means interposed between the running-gear and the first-mentioned shaft to rotate the same, and additional means to raise or lower said arms and parts carried thereby.

In testimony whereof we have signed our names to this specification in the presence of two subscribing witnesses.

BERT H. HERRICK.
FRANK CLEARY.

Witnesses:
HENRY ALBERTSON,
SEEDON CROCKETT.